R. B. PAIR.
CORN AND COTTON STALK CUTTER.
APPLICATION FILED FEB. 21, 1913.

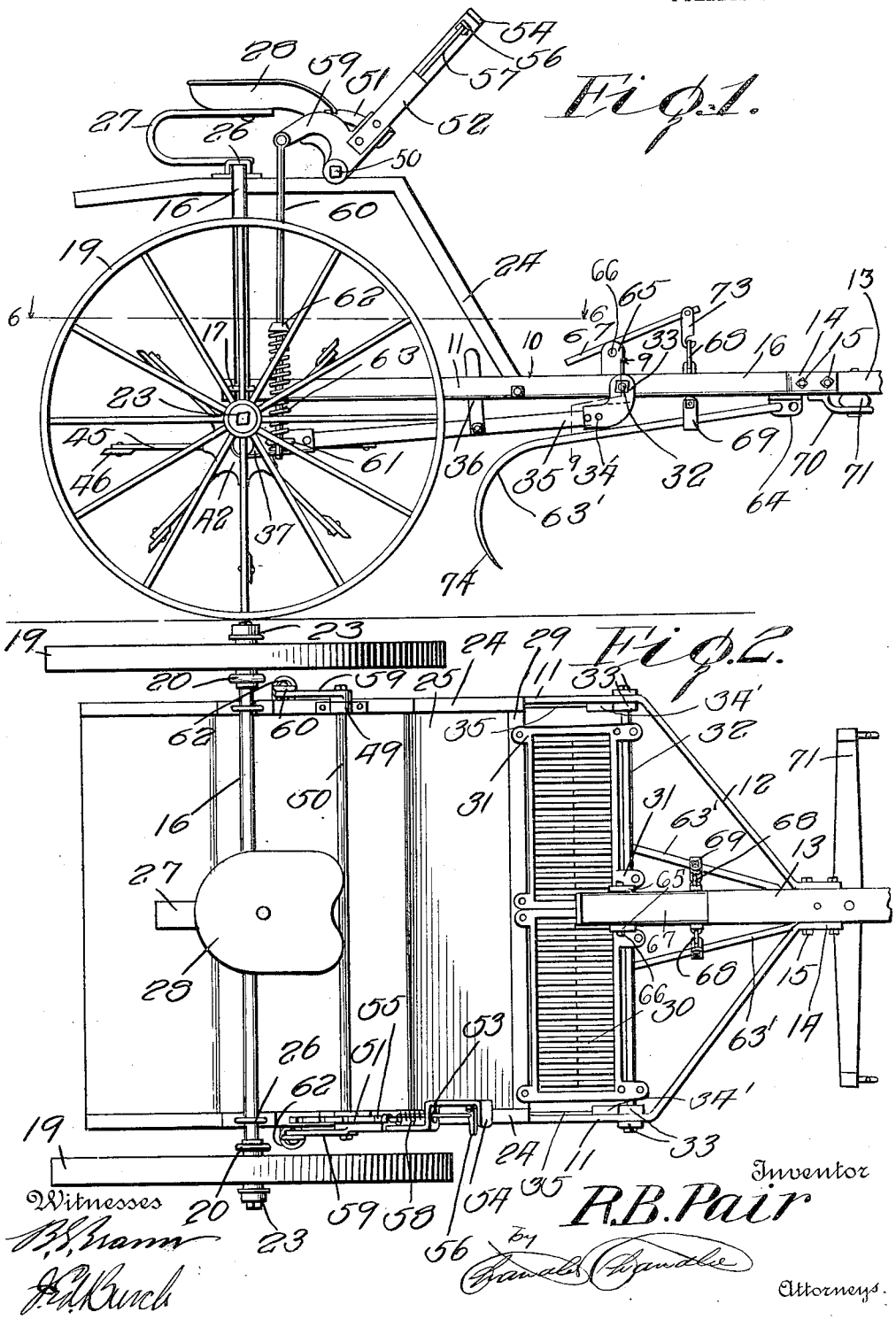

1,128,496.

Patented Feb. 16, 1915.
4 SHEETS—SHEET 2.

Witnesses

Inventor
R. B. Pair
by
Chandler & Chandler
Attorneys

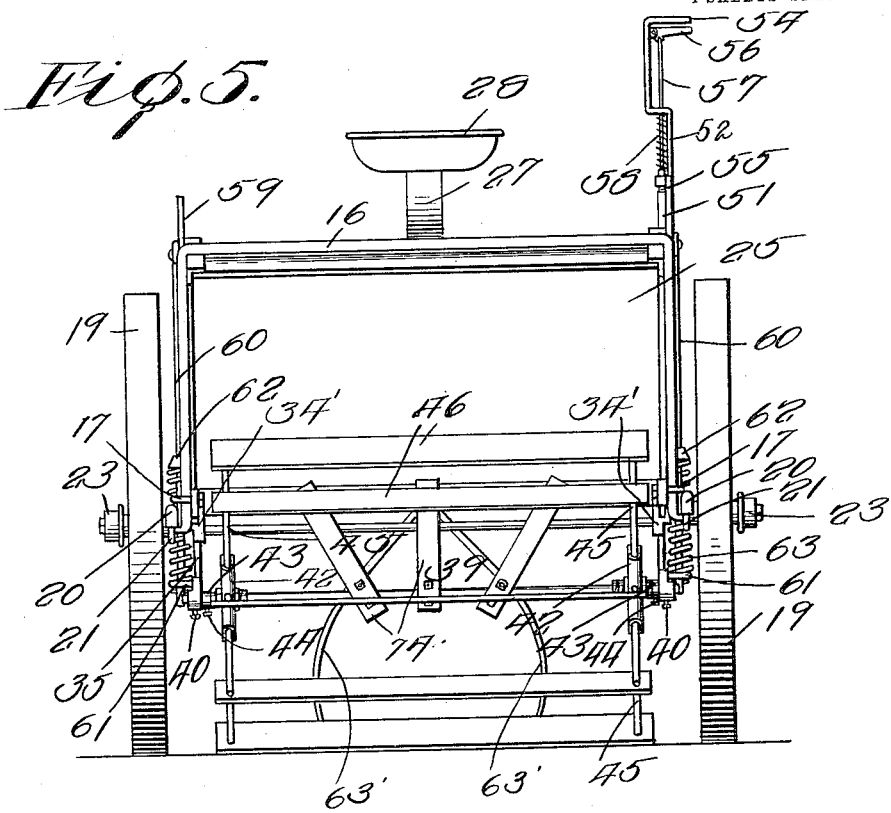
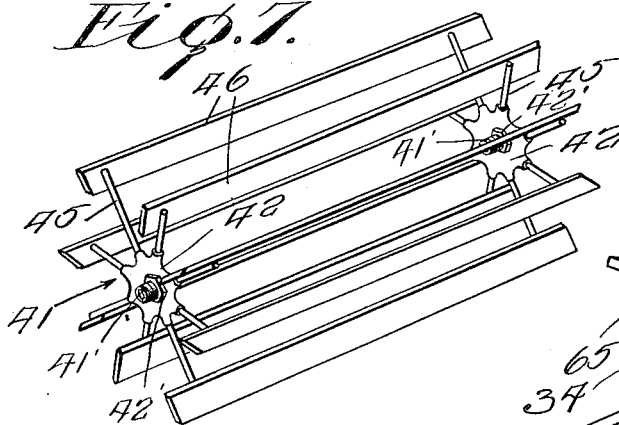
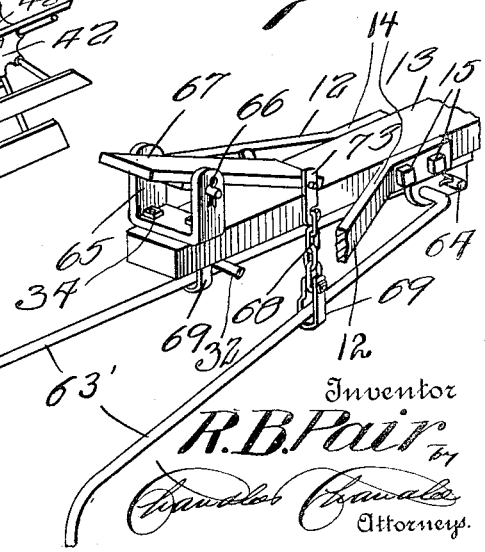

R. B. PAIR.
CORN AND COTTON STALK CUTTER.
APPLICATION FILED FEB. 21, 1913.
1,128,496.
Patented Feb. 16, 1915.
4 SHEETS—SHEET 4.
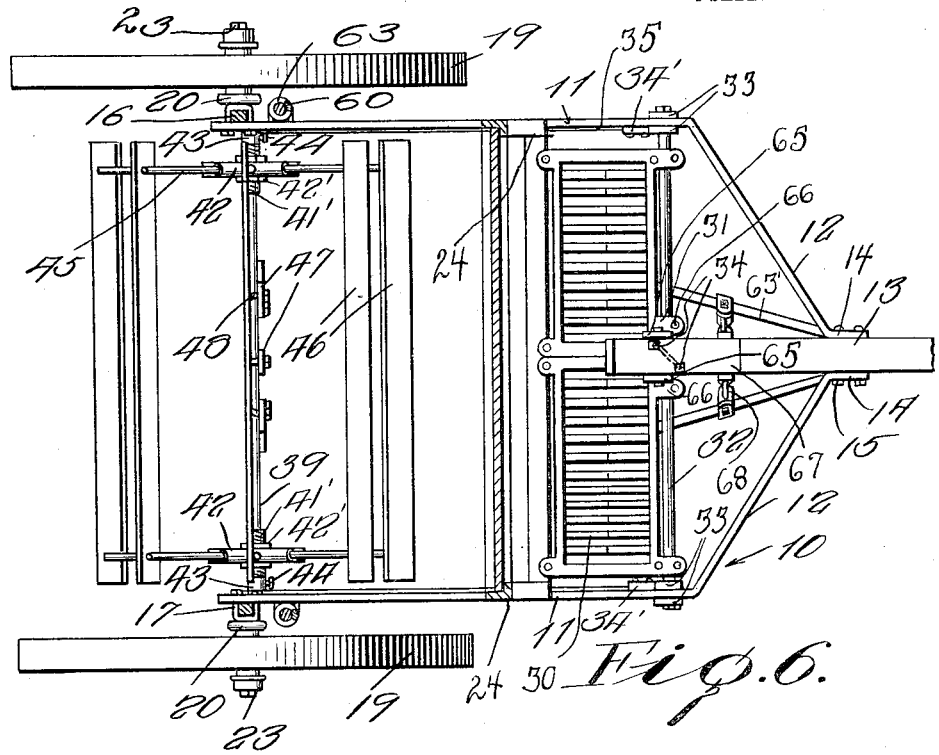
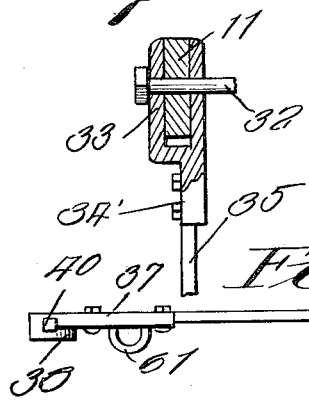
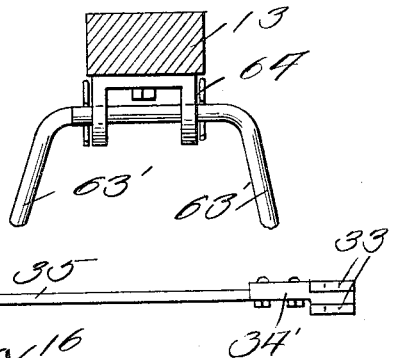
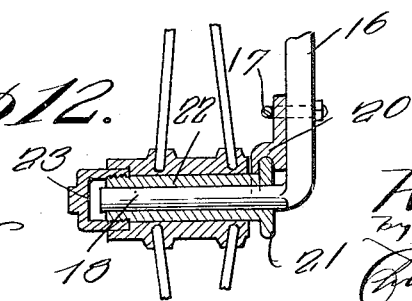
Witnesses
B. F. Brown
J. E. Burch
Inventor
R. B. Pair
By Chandler & Chandler
Attorneys

UNITED STATES PATENT OFFICE.

ROBERT B. PAIR, OF TYLER, TEXAS.

CORN AND COTTON STALK CUTTER.

1,128,496.   Specification of Letters Patent.   Patented Feb. 16, 1915.

Application filed February 21, 1913. Serial No. 750,002.

*To all whom it may concern:*

Be it known that I, ROBERT B. PAIR, a citizen of the United States, residing at Tyler, in the county of Smith, State of Texas, have invented certain new and useful Improvements in Corn and Cotton Stalk Cutters; and I do hereby declare the following to be a full, clear, and exact description of the invention, such as will enable others skilled in the art to which it appertains, to make and use the same.

This invention has special reference to stalk cutting machines and more particularly those adapted for cutting corn and cotton stalks after the stalks have been stripped, or for like purposes.

The essential object of the invention is evolved in the provision of a stalk cutter of the class described which is of simple, novel and durable structure and which is highly efficient in continued operation.

Another object of the invention is evolved in the provision generally, of a wheeled frame structure supporting the instrumentalities, which include a revolving cutter and novel means for supporting and raising and lowering the cutter relative to the ground surface, so as to vary the height at which the stalks may be cut.

A still further object of the invention is to provide means for raising and lowering the cutter, whereby breakage of the cutter is prevented, while novel means are also provided for preventing the stalks from choking during the cutting operation.

With the above and other objects in view, the invention resides more particularly in the peculiar combinations and arrangements of parts as will be partly illustrated as a preferred embodiment in the accompanying drawings and described in the specification, although the invention is protected for all desirable changes and uses within the scope of the invention as claimed.

Figure 3:
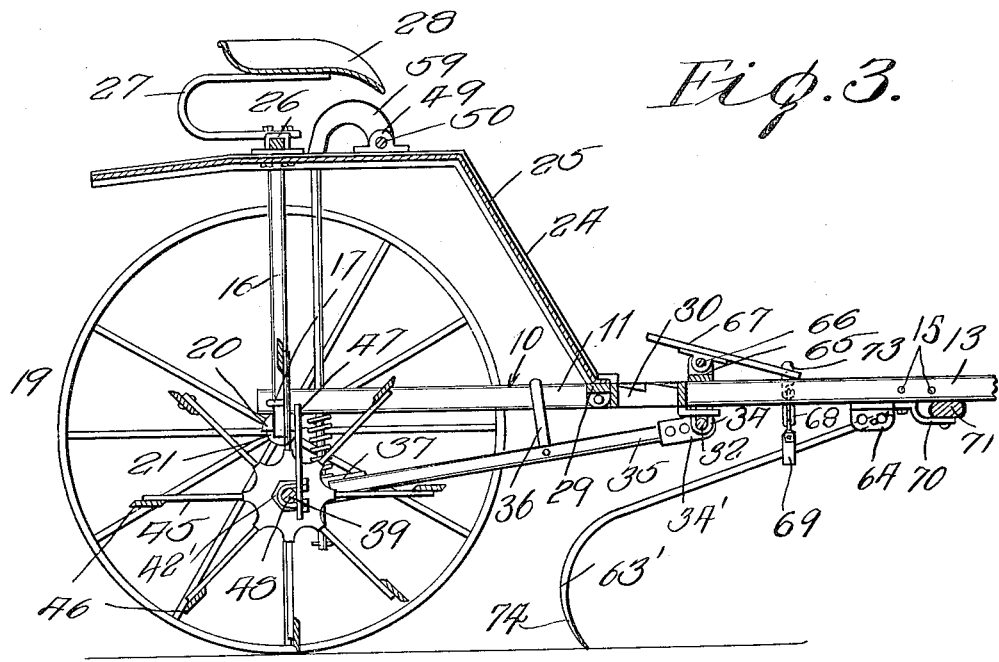
Figure 4:
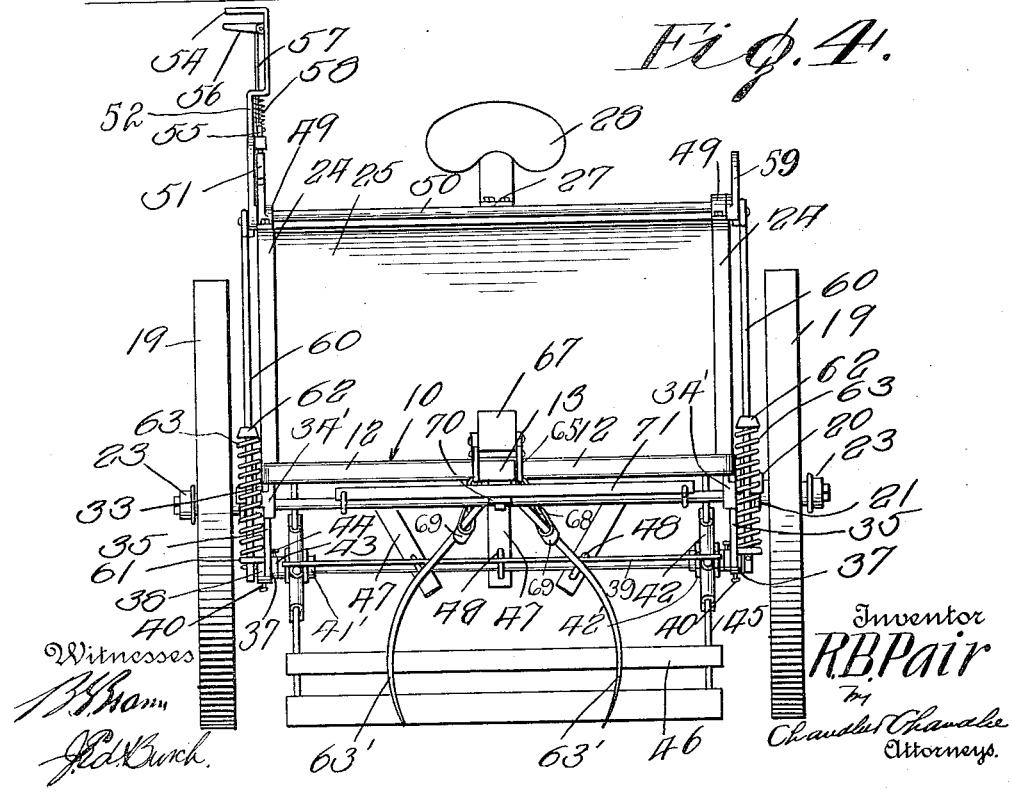

Figure 1 is a side elevation of my improved stalk cutter, the cutting element being disposed in an inoperative position. Fig. 2 is a top plan view of the device. Fig. 3 is a longitudinal sectional view therewith with the cutting element in an operative position. Fig. 4 is a front elevation of the device. Fig. 5 is a rear elevation. Fig. 6 is a horizontal sectional view on the line 6—6 of Fig. 1 but with the parts in their operative positions, certain of the parts being omitted and broken away the better to show the remainder. Fig. 7 is a detail perspective view of the cutting element. Fig. 8 is a detail view of the front portion of the frame in perspective and illustrating the foot operated means controlling the stalk hooks. Fig. 9 is a cross sectional view taken on the line 9—9 of Fig. 1. Fig. 10 is an enlarged detail view of one of the arms which serve to adjustably support the cutter element. Fig. 11 is an enlarged detail view of one of the supports for the hooks which are controlled by the foot lever for raising and lowering the drag hooks. Fig. 12 is a fragmentary sectional view of one of the wheel hubs and the adjacent spindle end of the arched axle.

In illustrating the preferred embodiment of the invention, my improved corn and cotton stalk cutter is illustrated as embodying a wheeled frame 10 of substantially yoke form but which includes the spaced parallel side portions 11, the forward ends of which are directed inward in convergent relation as shown at 12 and bolted to a draft tongue 13. This connection is accomplished through the medium of the spaced forwardly extending extremities 14 by means of transverse fastening bolts 15, the connection being made forwardly of the rear extremity of the tongue.

The rear ends of the side portions 11 of the frame are secured to the crank ends or depending portions of an arched axle 16, as by means of U-bolts 17, thereby serving to support the frame in an elevated position. The spindle ends 18 of the arched axle have transporting wheels 19 journaled thereon and such wheels are held from displacement by means of bell collars 20 which engage the flanged hubs of the wheels, thus serving to prevent displacement of the wheels and also to protect the bearings from dust or dirt and grit usually accompanying the same. The flanges or rings engaged by the bell collars 20 are designated by the numeral 21, the same being carried by the boxings 22 of the wheels and nuts 23 are threaded on the boxings.

Secured to the side portions of the frame near the juncture of the forwardly converging portions are a pair of supporting bars 24, the same being preferably of angular construction and extending a considerable distance above and in rear of the side portions of the frame and supporting a shield or cover 25 which is secured thereto. These bars 24 are also bolted to the arch of the axle 16 as by means of U-bolts 26 and it is to be observed that the shield and the supporting arms thereof are inclined considerably at their forward portions and are then directed horizontally or approximately so by two angular deviations at their upper portions spaced above the frame and transporting wheels. A spring standard 27 of U-form but disposed in a horizontal position, is bolted to the arch of the axle centrally and carries a seat 28 for the operator who is protected from the working parts by the shield 25.

The side portions of the frame are made rigid by a cross brace 29 which is secured thereto spaced from the portions 12 and this cross brace also serves for the attachment of the supporting bars 24 and the shield 25, as well as to serve for the attachment of foot rests 30. These foot rests embody reticulated frames which are provided with attaching ears 31 bolted to the cross brace 29 and to a pull shaft 32 spaced forwardly of the brace 29. This pull shaft 32 is secured to the side portions of the frame by means of double cuff castings 33 and is further bolted to the rearwardly projecting portion of the tongue as shown at 34, whereby the parts are rigidly braced. The shaft 32 is held stationary in the frame but is rotatably engaged at its extremities by the spaced portions of the castings 33 and the cuff portions 34' of the castings have rigidly secured thereto rearwardly extending arms 35 which swing on the pull shaft as a pivot and which are guided in their vertical movements beneath the side portions of the frame by means of guide bars 36 secured to and extending vertically from the arms. These bars engage the side portions of the frame and thus hold the arms against lateral shifting.

The swinging arms 35 serve to support the cutting element whereby the latter may be raised or lowered and for this purpose the cuff portions of castings 37 are bolted to the rear extremities of the arms, the cuff portions in each instance serving as sockets for receiving the extremities of the arms. The rear portions of the castings 37 are provided with hubs 38 receiving the extremity of a cutter spindle 39, said spindle being held against rotation in the bearings by set screws 40, one set screw being engaged through each bearing or hub portion, so that the spindle is fixed relative to the castings. The spindle 39 carries the cutting element which includes substantially a cylinder having spoked end frames 41 having hubs 42 which are rotatable on boxings 41' having nuts 42' thereon which together with the spindle are held against longitudinal shifting by cuffs or sleeves 43 held by set screws 44.

The cutter cylinder or drum further comprises the spokes 45 branching from and integral with the hubs 42 in the form of a plurality of radial arms arranged in co-incident relation and each co-incident pair of spokes or arms are connected by or form attaching means for the cutting blades or knives 46. These cutting blades or knives are double edged as clearly shown in Fig. 1 and can be reversed so that each edge can be used. The sleeves or collars 43 are mounted on the spindle outwardly of the hubs of the drum or cylinder and inwardly of the swinging arms. In order to prevent the stalks from choking the cutting cylinder during the cutting operation, the spindle 39 which is stationary but which rotatably carries the cutting cylinder, has attached thereto a plurality of stalk knockers 47 as by means of U-bolts 48, said knockers or dislodging members being arranged to permit rotation of the cylinder therearound and to cause the pieces of the stalks which may be carried around by the blades during the advancement of the machine, to be dislodged from the blades whereby positive operation is insured. It will be observed that the outer pair of knockers are directed toward the extremities of the cutting cylinder to more effectively serve this purpose or that they are all located on lines in radial extent from a common center. It will also be observed that the arrangement of the U bolt is such as to permit the arms or knockers 47 to be moved to or from each other, to be disposed at varying angles with respect to each other and to be rotated about the shaft 39. In other words the connection between the shaft and knocker is substantially universally jointed.

In order to raise or lower the cutting cylinder or element and to permit resilient upward movement thereof, bearing brackets 49 are secured to the supporting bars 24 to rotatably receive the extremities of a rod 50, which like the arched portion of the axle is preferably situated above the shield 25. One of these bearing members is formed with an integral rack segment 51 and the adjacent end of the rod carries an adjustable throw lever 52 having its upper end offset and the offset provided with an opening 53, while the upper end of the lever is directed outwardly as shown at 54 to provide a hand grip which will not tend to injure or impair the movements of the operator. A latch 55 coöperates with the rack and includes a pivoted hand grip 56 connected to the latch by means of a rod 57 which extends through the aperture in the offset portion of the lever. The latch of course is normally held in engagement with the rack by spring means 58 mounted on the rod 57. Means having thus been described for turning the rod 50, the connections between the rod and the swinging arms which support the cutting cylinder include curved rearwardly extending arms 59 attached to the rod and in one instance carrying the throw lever, while spring links 60 connect these arms with the arms 35 and are movably engaged through outwardly extending eyes 61. The rods are movable through the eyes and carry adjustable set collars 62 which serve to adjust the tension of expansible springs 63 which are engaged on the rods between the collars and eyes and serve to permit resilient upward movement of the cutting cylinder, whereby breakage to the parts composing the same is prevented, as for instance in passing over a stump or protuberance. It is of course understood that the springs serve to normally hold the arms 35 and the cutting element carried thereby downwardly displaced but since the arms cannot move off of the links or rods 60, it is apparent that forward shifting of the throw lever will raise the crank arms 59 and correspondingly raise the cutting element or vice versa, while the lever may be held in different adjusted positions to cut the stalks at the desired height.

In order to insure positive cutting of the stalks, means are provided in the form of drag hooks 63' for raising the stalks from the ground when they may have been blown down and in order to pivotally support the hooks at each side of the frame an apertured bracket 64 is secured to the under face of the tongue, such bracket being in the form of a casting having spaced apertured jaws pivotally receiving the shank portions of the hooks so that the hooks will extend outwardly and rearwardly. Foot operated means are provided for raising and lowering the hooks, such means consisting of a U-shaped support 65 which is mounted on the rear portion of the tongue, the leg portions of the support carrying a removable horizontal pivot 66 upon which is pivotally mounted a longitudinally extending foot lever 67. The forward extremity or longer arm of the foot lever carries a pair of chains or other flexible connections 68 which are engaged with the hooks through the medium of clamps 69 carried at the free ends of the chains. It will thus appear that the operator when occupying the driver's seat will be protected from the flying stalks by the shield or apron and, will be in convenient position of the throw lever and the foot lever or treadle to raise and lower the cutting cylinder and the drag hooks for raising the stalks from the ground.

In order to attach the draft animals to the tongue, a clevis 70 of angular formation is bolted to the bracket 64 so as to extend forwardly spaced beneath the tongue and the attaching portions 14 of the frame members, thus providing a space for receiving and supporting a double tree 71, although it is apparent that any form of draft member or means may be provided without departing from the spirit of the invention. It will also be observed that the bell collars 20 which are secured to the crank portions of the axle 16, are held by clamps or U-bolts 17 so that the wheels may be held on without the use of nuts, except those provided for closing the ends of the boxings. The chains or flexible connections 68 are also attached to the foot lever 67 by means of oppositely extending hooks 73.

In the operation of the device, the machine is advanced across a field of stalks, the draft animals traveling on each side of the rows and those stalks which have been blown down will be elevated by the drag hooks 63' by swinging the foot lever 67 on its pivot and this operation is greatly facilitated owing to the fact that the hooks are provided with tapered tines 74, it being understood that the drag hooks can be readily raised or lowered through the medium of the foot lever or treadle. The stalks will then pass under the frame-work and will be engaged by the blades of the cutting element or cylinder as the latter is caused to revolve on the spindle 39 by contact with the stalks, thus causing the blades when at their lowermost point to cut the stalks. The pieces of the stalks thus cut will be delivered in the rear of the machine and the shield or apron 25 will protect the driver from any flying pieces. It will also be apparent that since the knockers or dislodging members 47 will just permit the clearance of the blades, any pieces of the stalks which are carried upward will be removed from the blades, thus preventing the cutting cylinder from choking during the cutting operation. It is further apparent that the cutting cylinder may be raised or lowered with convenience by the driver, the rod 50 causing both of the arms 35 to be simultaneously shifted while the guide bars 36 hold the cutting cylinder in perfect alinement with respect to the frame, especially during resilient upward movement of the cylinder against the action of the springs 63. The device is further advantageous owing to the fact that the parts can be readily and cheaply replaced.

I claim:

1. In a stalk cutter, a revolving cutting cylinder, a plurality of dislodging members around which the cylinder revolves, a support for said cylinder and members, and means to secure said members in substantially universal adjustment on said support.

2. In a corn and cotton stalk cutter, a transporting frame, a cutting element support carried by said frame, a cutting element revolubly carried thereby and having a series of cutting blades, stationary means mounted within the area of the blades for clearing the stalks cut thereby and means for securing the last mentioned members in adjustment on said support.

3. A stalk cutter embodying a frame, arms pivoted to the frame, a stationary spindle carried by the arms, a cutting element rotatable on the spindle, means for raising and lowering the arms and spindle with respect to the frame, a plurality of dislodging members mounted for movement along and rotation about said spindle, and means to lock said members in adjusted position.

In testimony whereof, I affix my signature, in the presence of two witnesses.

ROBERT B. PAIR.

Witnesses:
 FELIX SMITH,
 J. J. LONG.

Copies of this patent may be obtained for five cents each, by addressing the "Commissioner of Patents Washington, D. C."